United States Patent
Bongaerts et al.

(10) Patent No.: US 11,279,334 B2
(45) Date of Patent: Mar. 22, 2022

(54) LOAD-DEPENDENT TRAILER BRAKE SYSTEM AND METHOD OF CONTROLLING SUCH

(71) Applicant: AGCO International GmbH, Neuhausen (CL)

(72) Inventors: Eric Bongaerts, Slek-Echt (NL); Michiel Nijsten, Grubbenvorst (NL)

(73) Assignee: AGCO International GmbH, Neuhausen (CH)

( * ) Notice: Subject to any disclaimer, the term of this patent is extended or adjusted under 35 U.S.C. 154(b) by 431 days.

(21) Appl. No.: 16/229,788

(22) Filed: Dec. 21, 2018

(65) Prior Publication Data

US 2019/0202423 A1 Jul. 4, 2019

(30) Foreign Application Priority Data

Dec. 29, 2017 (GB) .................................... 1722251

(51) Int. Cl.
*B60T 8/18* (2006.01)
*B60T 13/26* (2006.01)
(Continued)

(52) U.S. Cl.
CPC ............... *B60T 8/18* (2013.01); *A01B 59/04* (2013.01); *A01B 76/00* (2013.01); *A01M 7/0042* (2013.01); *A01M 7/0085* (2013.01); *B60D 1/14* (2013.01); *B60D 1/248* (2013.01); *B60T 8/171* (2013.01); *B60T 8/1837* (2013.01); *B60T 8/1843* (2013.01); *B60T 13/265* (2013.01); *B60T 13/68* (2013.01); *B60D 2001/008* (2013.01);
(Continued)

(58) Field of Classification Search
CPC .......... B60T 8/18; B60T 8/171; B60T 8/1837; B60T 8/1843; B60T 13/265; B60T 13/68; B60T 13/683; A01B 59/04; A01B 76/00; B60D 1/248
See application file for complete search history.

(56) References Cited

U.S. PATENT DOCUMENTS 4,640,556 A * 2/1987 Fauck .................... B60T 8/1881
303/22.1
5,251,966 A * 10/1993 Friederichs ............. B60T 13/66
303/7
(Continued)

FOREIGN PATENT DOCUMENTS

CN 201 217 435 Y 4/2009
DE 197 52 147 A1 5/1999
(Continued)

OTHER PUBLICATIONS

UK Intellectual Property Office, Search Report for Priority UK Application No. GB 1722251.4, dated Jun. 12, 2018.
(Continued)

*Primary Examiner* — Minnah L Seoh
*Assistant Examiner* — Michael R Stabley

(57) ABSTRACT

A trailer brake system that generates load-dependent braking forces. Variable trailer load information is used to generate load-dependent control signals which serve to control an electrically-controlled proportional valve. A load sensing valve serves to modify brake command signals in dependence on a control pressure that is regulated by the proportional valve.

20 Claims, 2 Drawing Sheets

(51) Int. Cl.

| | |
|---|---|
| *A01B 59/04* | (2006.01) |
| *A01B 76/00* | (2006.01) |
| *B60D 1/24* | (2006.01) |
| *A01M 7/00* | (2006.01) |
| *B60D 1/14* | (2006.01) |
| *B60T 8/171* | (2006.01) |
| *B60T 13/68* | (2006.01) |
| *B60T 8/17* | (2006.01) |
| *B60D 1/00* | (2006.01) |

(52) U.S. Cl.
CPC ........... *B60T 8/1708* (2013.01); *B60T 13/683* (2013.01); *B60T 2270/403* (2013.01)

(56) References Cited

U.S. PATENT DOCUMENTS

| | | | | |
|---|---|---|---|---|
| 5,294,190 A | * | 3/1994 | Feldmann | ............... B60T 13/66 |
| | | | | 303/118.1 |
| 5,372,413 A | * | 12/1994 | Broome | ................. B60T 8/323 |
| | | | | 303/118.1 |
| 5,382,085 A | | 1/1995 | Zbinden | |
| 5,477,739 A | * | 12/1995 | Holler | ....................... B60T 7/20 |
| | | | | 73/862.57 |
| 5,549,364 A | * | 8/1996 | Mayr-Frohlich | ...... B60T 8/1708 |
| | | | | 303/123 |
| 5,848,826 A | | 12/1998 | Muller | |
| 6,012,781 A | * | 1/2000 | Gerum | ..................... B60T 7/20 |
| | | | | 303/22.4 |
| 6,272,417 B1 | * | 8/2001 | Ross | ..................... B60T 8/1764 |
| | | | | 303/121 |
| 6,367,887 B1 | * | 4/2002 | Sulzyc | ................. B60T 8/1887 |
| | | | | 303/15 |
| 6,666,527 B2 | * | 12/2003 | Gill | ......................... B60T 8/323 |
| | | | | 188/112 R |
| 7,302,837 B2 | * | 12/2007 | Wendte | ................. B60C 23/002 |
| | | | | 340/442 |
| 9,464,953 B2 | * | 10/2016 | Wirthlin | ................. G01G 19/08 |
| 9,573,577 B2 | * | 2/2017 | Hilberer | ................. B60T 17/04 |
| 2018/0273014 A1 | * | 9/2018 | Boulivan | ................ B60T 7/042 |

FOREIGN PATENT DOCUMENTS

| | | |
|---|---|---|
| EP | 0 018 227 A1 | 10/1980 |
| GB | 2 509 791 A | 7/2014 |
| JP | H09 58446 A | 3/1997 |
| WO | 91/12160 A2 | 8/1991 |

OTHER PUBLICATIONS

European Patent Office, Search Report for related EP Application No. EP18209424.3, dated Apr. 17, 2019.

* cited by examiner

LOAD-DEPENDENT TRAILER BRAKE SYSTEM AND METHOD OF CONTROLLING SUCH

BACKGROUND

Field of the Invention

The invention relates to trailer brake systems that are operated by pressurised fluid and particularly to those systems that generate a braking force that is dependent upon the trailer load.

Description of Related Art

Trailer brake systems are fitted to trailers of tractor-trailer combinations in both on-road and off-road applications. It is known to equip trailer brake systems with load-dependent brake functionality which provides for a braking force that is proportional to the trailer load in order to reduce the risk of wheels locking when the trailer is unladen or partially laden. In pneumatic systems it is known to provide a load sensing valve which is either pressure controlled by connection to the air suspension system, or mechanically by a lever coupled to the chassis, the load sensing valve being operable to modify a brake command signal dependent upon the trailer load.

The requirement for a mechanical or pneumatic connection between the load sensing valve and the trailer's suspension system is both cumbersome, expensive and vulnerable to reliability issues which has the potential for the braking system to not adjust the braking force to the trailer load adequately. There is a continued desire to seek improved solutions for providing load dependent functionality in trailer brake systems.

BRIEF DESCRIPTION OF THE INVENTION

According to a first aspect of the invention there is provided a trailer brake system comprising a brake actuator connected to a pressure supply line via a pressure-controlled relay valve having a first control port which is connected to a command line via a pressure-controlled load sensing valve, wherein the load sensing valve comprises a second control port connected to a control line via an electrical proportional valve, and an electronic controller in communication with the proportional valve and configured to generate a load-dependent control signal from trailer load information for controlling the proportional valve.

By utilising an electronic controller in conjunction with an electrically-controlled proportional valve, a braking signal can be regulated depending on trailer load information without the need for a mechanical, pneumatic or hydraulic connection between the suspension system and the braking circuit. Furthermore, by providing the electronic input to the control line, any electrical failure leading to operational failure of the proportional valve does not directly impede the brake signal delivered by the command line to the relay valve thereby ensuring a failsafe system. Moreover, by maintaining a pressure-controlled load sensing valve, existing off-the-shelf valves can be utilised making the modification to existing brake systems relatively cheap and simple.

The control line is preferably connected to the pressure supply line. Advantageously, the system pressure is therefore exploited to provide the pressure-based control signal to the load sensing valve, albeit regulated by the proportional valve. As such, the braking system remains self-contained with no requirement for a further pressure source to control the load sensing valve.

The load sensing valve is preferably operable to open under positive pressure at the second control port as is the case for known systems that derive the load sensing signal by connection to a suspension system. Advantageously, the current invention can be thus implemented with a load sensing valve of the same functionality making for simple installation and retrofitting.

The load sensing valve may also be operable to maintain a non-zero minimum open condition in the absence of a positive pressure at the second control port thereby ensuring that a minimum legislative required braking control pressure can be delivered in the event of failure of the proportional valve.

The proportional valve is preferably operable to close in a failed state. As such, in the failed state, no load adjustment is made to the braking command signal avoiding the risk of locking up wheels with unladen trailers.

The invention is especially beneficial in pneumatic (or air) trailer braking systems. However, it is envisaged that the invention could have application in hydraulic braking systems with the pneumatic components appropriately substituted.

The braking system may be embodied on a trailer which may be, by way of example only, a highway truck or lorry trailer, an agricultural trailer, a construction trailer, or a domestic trailer.

The trailer may comprise a drawbar for coupling to a tractor or other towing vehicle, and a drawbar load sensor coupled to the drawbar and in communication with the controller. The drawbar load sensor may be arranged to generate at least a portion of said trailer load information, wherein the information may be representative of the load carried on the drawbar.

The trailer may comprise an axle to which ground engaging wheels may be rotatably mounted. An axle load cell may be arranged proximate to, or adjacent to, the axle, and in communication with the controller. The load cell may be arranged to generate at least a portion of said trailer weight information in the form of data that is representative of the load carried on the trailer axle.

The trailer may be a trailed agricultural sprayer. The sprayer may comprise a product receptacle in the form of a fluid tank or bulk hopper by way of example. The receptacle may be provided with a fill-level sensor in communication with the controller. The fill-level sensor may be arranged to generate fill-level information in association with the product receptacle, wherein the trailer weight information is generated based upon the fill-level information.

According to a second aspect of the invention there is provided a method of controlling a trailer brake system comprising receiving trailer weight information, generating an electronic load-dependent control signal based upon the trailer weight information, and controlling an electrically-controlled proportional valve with the load-dependent control signal, wherein the proportional valve is arranged to regulate a control pressure which is supplied to control a load-sensing valve in a trailer brake system.

The method may further comprise receiving trailer inclination information, wherein the generated load-dependent control signal is also based upon the trailer inclination information. The trailer inclination information may be generated by an on-board inclination sensor that is mounted upon the tractor or trailer. Alternatively, the trailer inclination information may be derived from 3D or topographical GNSS data. The load-dependent control signal may be generated so as to result in a lighter trailer brake demand when the tractor/trailer is descending an incline and when a greater proportion of the trailer load is carried on the tractor axles.

BRIEF DESCRIPTION OF THE DRAWINGS

Further advantages of the invention will become apparent from reading the following description of specific embodiments with reference to the appended drawings in which.

DETAILED DESCRIPTION OF THE INVENTION

Figure 1:
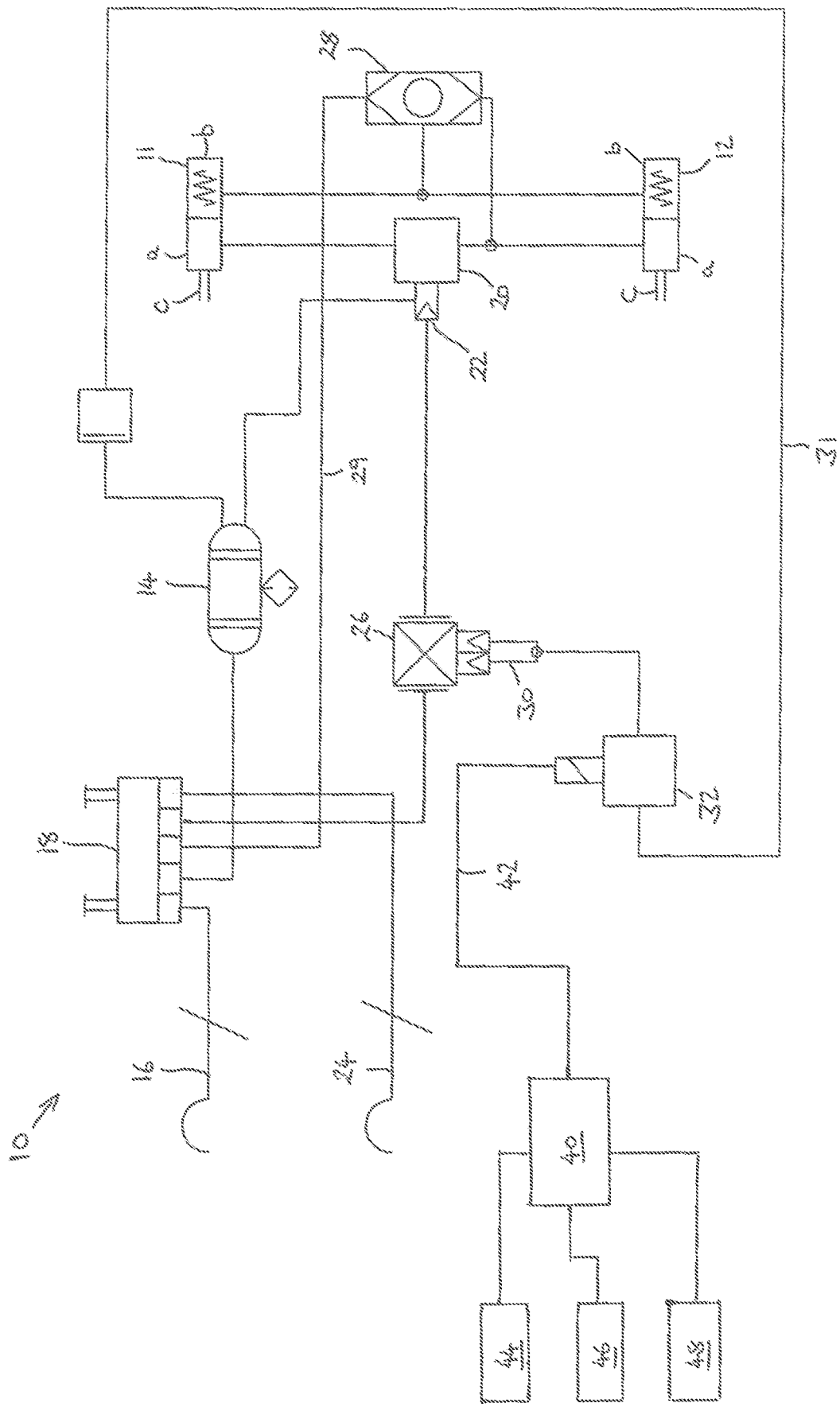
FIG. 1 is a diagrammatic view of a trailer brake system in accordance with an embodiment of the invention, and, FIG. 2 is a flow chart showing an example process flow for generating a load-dependent control signal in receipt of trailer load information.

With reference to FIG. 1, a trailer brake system 10 includes first and second pneumatic brake actuators 11,12 each being associated with a wheel of a trailer (not shown). The trailer may be a single axle or a multi-axle trailer. The actuators 11,12 in the illustrated embodiment are of a known dual chamber type having a service chamber 'a', a spring chamber 'b', and a piston 'c', wherein each chamber has a dedicated port for connection to respective air lines. The piston 'c' of each actuator 11,12 is connected to a brake linkage associated with a wheel and is extendable to apply a braking force.

A pressure source in the form of an air tank 14 is supplied with pressurised air via a connection to a tractor air supply line 16 and a distribution manifold 18. In an alternative arrangement, a local compressor may be provided on the trailer to supply the air tank 14. The air tank 14 is maintained at a working pressure.

A relay valve 20 is connected to the air tank 14 and the service chambers 'b' of the actuators 11,12. The relay valve 20 comprises a control port 22 which is connected to a tractor brake command line 24 via a load sensing valve 26 and the manifold 18. The relay valve 20 serves to control the flow of pressurised air from the air tank 14 to the actuators 11,12 during a service brake application. The provision of a relay valve is known and shortens the response and pressure build-up times during a brake application.

Brake application commands are conveyed to the control port 22 in the form of a variable pneumatic pilot pressure signal. An increased braking demand from the connected tractor results in a greater pilot pressure to be delivered through command line 24 which causes relay valve 20 to allow a greater pressure to be passed from air tank 14 to the actuators 11,12.

Brake pressure overload protection is provided by a double check valve 28. During use when connected to a tractor, the spring chambers 'b' are pressurised by connection to the tractor air supply line 16 via the manifold 18, parking brake line 29, and double check valve 28, so that the parking brake is released. The double check valve 28 also permits pressurised air from relay valve 20 (caused by a service brake application) to be passed to the spring chambers 'b' in case of failure of the air supply from parking brake line 29. Moreover, the actuators 11,12 are protected by the check valve 28 from damage caused by compounded brake forces from the parking and service brake systems.

The brake application commands delivered to control port 22 are regulated by load sensing valve 26 which comprises a control port 30 that is connected to air tank 14 via a control line 31 and an electro-pneumatic proportional valve 32. Load sensing valve 26 is of the pressure-to-open type which is operable to open under positive pressure (above a threshold) at the control port 30. In order to avoid complete closure of load sensing valve 26 (and blocking of all braking commands) means are provided to maintain a non-zero flow connection between the command line 24 and the relay valve 20. Adjustment means may also be provided to adjust the minimum open condition of the load sensing valve 26.

Off-the-shelf load sensing valves, such as the 475 700 series of valves available from WABCO (Registered trade mark), are suitable for use as valve 26. Although shown as two separate components, it is envisaged that load sensing valve 26 and proportional valve 32 could be integrated into a single component which delivers the same functionality.

Proportional valve 32 serves to modify the pilot pressure delivered to control port 30 and, as such, modify the braking command signals. In accordance with an aspect of the invention the valve 32 is controlled electrically by load-dependent control signals generated by an electronic controller 40 which is in wired or wireless communication with valve 32 via line 42 shown in FIG. 1. The controller 40 may be located on the trailer or on the towing tractor, wherein, in the latter case, the controller 40 may be connected to the valve 32 by an ISOBUS connection or other data communications link/bus.

In the illustrated embodiment the proportional valve 32 is configured to fail in a closed state so that insufficient pressure is delivered to load sensing valve 26 and only the minimum legislative braking force is delivered. In an aternative embodiment, the load sensing valve 26 may be of a pressure-to-close type whilst the proportional valve 32 fails in an open state. As such, provided the control line 31 remains pressured, the load sensing valve 26 maintains the minimum legislative braking pressure even in the event of electrical failure.

If an electrical failure of valve 32 occurs due to a shortcut or an open line, then controller 40 may be configured to detect this and generate an error alert for communication to the operator.

Although described as a pneumatic system, it is envisaged that at least some of the components and circuit portions could be replaced with hydraulic-based alternatives. For example, instead of connection to the air tank 14, the control line could be hydraulic with appropriate connection to a pressurised source. Load sensing valve 26 could be replaced with a hydraulic-actuated alternative, and proportional valve 17 replaced with an electro-hydraulic proportional valve.

Turning back to FIG. 1, at least one of a drawbar load sensor 44, an axle load cell 46, and a fill-level sensor 48 is connected to controller 40. One or more of sensors 44,46,48 provide trailer load information that is representative of the trailer weight including the load, or of the variable payload alone. The controller 40 is configured to generate a valve setpoint value that is representative of the trailer load information. The valve setpoint is then used to control proportional valve 32. Although not shown, a user interface device may be provided in communication with the controller 40, wherein the trailer load information may be inputted manually.

Figure 2:
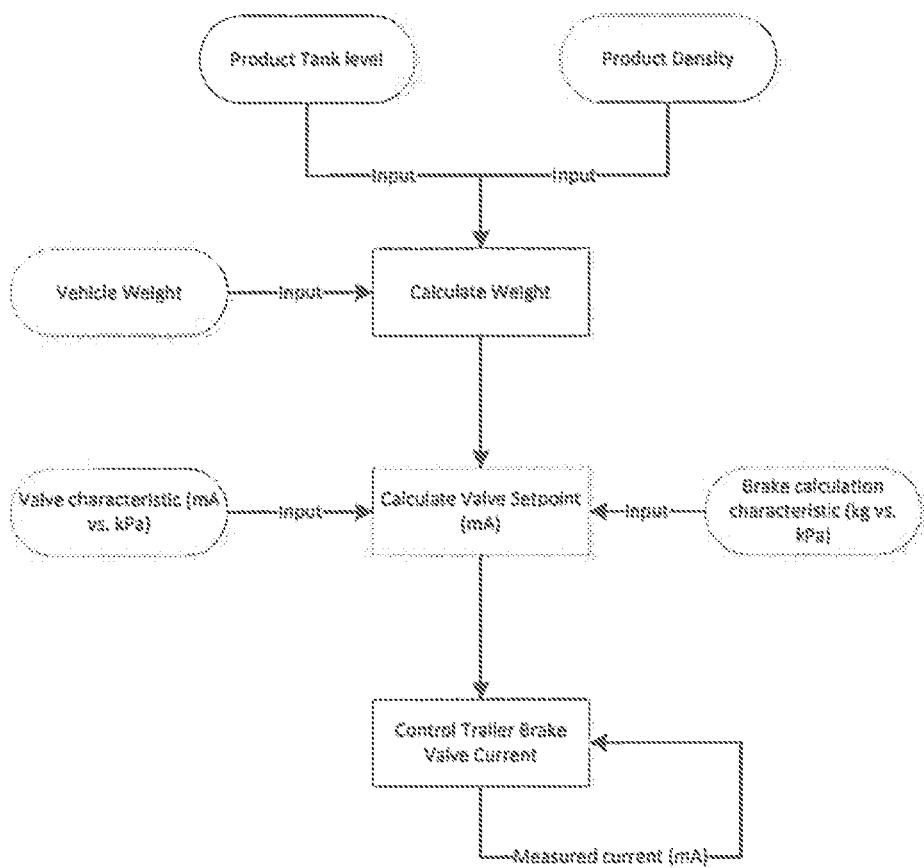

FIG. 2 shows the process flow executed by the controller 40 when embodied on a trailed agricultural sprayer having a product tank for storing a pesticide solution for application to a crop field. Fill level sensor 48 generates a signal that is representative of the fluid volume in the tank and is communicated to the controller 40. Together with stored values of the product density and the sprayer (unladen) weight, the product tank level is used to generate a value that represents the total (loaded) weight of the sprayer. The valve setpoint is then calculated using the calculated weight, stored valve characteristics for the proportional valve 32 and stored brake calculation characteristics.

In summary there is provided a trailer brake system that generates load-dependent braking forces. Variable trailer load information is used to generate load-dependent control signals which serve to control an electrically-controlled proportional valve. A load sensing valve serves to modify brake command signals in dependence on a control pressure that is regulated by the proportional valve.

From reading the present disclosure, other modification will be apparent to persons skilled in the art. Such modifications may involve other features which are already known in the field of trailer brake systems and component parts therefore and which may be used instead of or in addition to features already described herein.

The invention claimed is:

1. A trailer brake system comprising a brake actuator connected to a pressure source via a pressure-controlled relay valve having a first control port which is connected to a command line via a pressure-controlled load sensing valve, wherein the load sensing valve comprises a second control port connected to a control line via an electrical proportional valve, and an electronic controller in communication with the proportional valve and configured to generate a load-dependent control signal from trailer load information for controlling the proportional valve.

2. The trailer brake system according to claim 1, wherein the control line is connected to the pressure source.

3. The trailer brake system according to claim 1, wherein the proportional valve is operable to close in a failed state.

4. A pneumatic trailer brake system according to claim 1.

5. A trailer comprising a brake system according to claim 1.

6. The trailer according to claim 5, further comprising a drawbar and a drawbar load sensor coupled to the drawbar and in communication with the controller, wherein the drawbar load sensor is arranged to generate at least a portion of said trailer load information.

7. The trailer according to claim 5, further comprising an axle and an axle load cell arranged proximate to the axle and in communication with the controller, wherein the load cell is arranged to generate at least a portion of said trailer load information.

8. A trailed agricultural sprayer according to claim 5.

9. The trailed agricultural sprayer according to claim 8, further comprising a product receptacle and a fill-level sensor in communication with the controller, wherein the fill-level sensor is arranged to generate fill-level information in association with the product receptacle, and wherein the trailer load information is generated based upon the fill-level information.

10. A trailer brake system comprising a brake actuator connected to a pressure source via a pressure-controlled relay valve having a first control port which is connected to a command line via a pressure-controlled load sensing valve, wherein the load sensing valve comprises a second control port connected to a control line via an electrical proportional valve, and an electronic controller in communication with the proportional valve and configured to generate a load-dependent control signal from trailer load information for controlling the proportional valve, wherein the load sensing valve is operable to open under positive pressure at the second control port, and wherein the load sensing valve is operable to maintain a non-zero minimum open parameter in the absence of a positive pressure at the second control port.

11. The trailer brake system according to claim 10, wherein the load sensing valve comprises adjustment means to adjust the minimum open parameter.

12. The trailer brake system according to claim 10, wherein the control line is connected to the pressure source.

13. A trailer comprising a brake system according to claim 10.

14. The trailer according to claim 13, further comprising a drawbar and a drawbar load sensor coupled to the drawbar and in communication with the controller, wherein the drawbar load sensor is arranged to generate at least a portion of said trailer load information, and further comprising an axle and an axle load cell arranged proximate to the axle and in communication with the controller, wherein the load cell is arranged to generate at least a portion of said trailer load information.

15. The trailer according to claim 13, further comprising a product receptacle and a fill-level sensor in communication with the controller, wherein the fill-level sensor is arranged to generate fill-level information in association with the product receptacle, and wherein the trailer load information is generated based upon the fill-level information.

16. A method of controlling a trailer brake system comprising receiving trailer load information, generating an electronic load-dependent control signal based upon the trailer weight information, and controlling an electrically-controlled proportional valve with the load-dependent control signal, wherein the proportional valve is arranged to regulate a control pressure which is supplied to control a load-sensing valve in a trailer brake system.

17. The method according to claim 16, wherein the trailer load information is representative of both weight of a trailer and of a trailer payload.

18. The method according to claim 16, wherein said step of receiving trailer load information involves receiving fill-level information from a fill-level sensor arranged in association with a product tank.

19. The method according to claim 16, further comprising receiving trailer inclination information, wherein the generated load-dependent control signal is also based upon the trailer inclination information.

20. A trailer brake system configured to execute the method of claim 16.

* * * * *